United States Patent [19]
Rambaud

[11] 3,835,762
[45] Sept. 17, 1974

[54] DEVICE FOR THE STERILIZATION OF FOOD PRODUCTS IN FLEXIBLE PACKAGES

[75] Inventor: Michel Rambaud, Paris, France

[73] Assignee: Etablessements Gatineau S.A., Villers-Cotterets, France

[22] Filed: Mar. 10, 1972

[21] Appl. No.: 233,462

[30] Foreign Application Priority Data
Mar. 29, 1971  France .......................... 71.10877
July 12, 1971  France .......................... 71.25427

[52] U.S. Cl. .................................. 99/483, 99/516
[51] Int. Cl. ......................... B65b 55/02, A23l 3/12
[58] Field of Search ............ 99/470, 468, 483, 516; 53/25, 127

[56] References Cited
UNITED STATES PATENTS

| | | | |
|---|---|---|---|
| 2,587,939 | 3/1952 | Webb .................................. | 99/470 |
| 3,313,631 | 4/1967 | Jensen .............................. | 99/517 X |
| 3,464,835 | 9/1969 | Castro ................................ | 53/25 X |
| 3,528,826 | 9/1970 | Wilson ............................... | 53/25 X |
| 3,570,391 | 3/1971 | Rejler ............................... | 99/468 X |
| 3,718,082 | 2/1973 | Lipoma ............................... | 99/483 |

*Primary Examiner*—Harvey C. Hornsby
*Assistant Examiner*—Alan Cantor
*Attorney, Agent, or Firm*—Young & Thompson

[57] ABSTRACT

A device for the sterilization of food products in flexible packages, e.g., preserves, comprising at least one autoclave adapted to hold said preserves for treatment, in which the said autoclave is associated with two hermetically-closed heated tanks intended to be partly filled with water, upper conduits and lower conduits being provided for coupling respectively together the top portions and the bottom portions of said autoclave and said tanks, and further comprising pumping means adapted to effect the circulation of hot water in a closed pressurized circuit through the said autoclave, so as to effect a heat treatment in two successive periods and at two different temperatures. The apparatus is particularly suitable for the treatment of raw scraped potatoes packed under vacuum in transparent plastic bags.

9 Claims, 2 Drawing Figures

DEVICE FOR THE STERILIZATION OF FOOD PRODUCTS IN FLEXIBLE PACKAGES

The present invention relates to a device for the sterilization of food products in flexible packages, e.g., preserves, this device being of the type comprising at least one autoclave in which the preserves are intended to be stored and which is associated with heating and pressurizing means.

The marketing of preserved food products in flexible packings, for example of plastic material, of plastic and aluminum complex, etc., offers excellent guarantees of preservation and is less expensive and more practical than the use of metal cans or glass receptacles. On the other hand, the quality of the products is better since, contrary to that which is the case for stiff packings, the foodstuffs are not immersed in their own water in which they gradually lose, by dissolving, a part of their taste and their nutritive principles: sugar and mineral salts in particular.

The destruction by heat of microbic germs with a view to the sterilization of the foodstuff treated is identically the same whether it is applied to flexible packings or to metal cans. However, the practical realization of the heat treatment is different since, at the sterilization temperature, the mechanical strength of flexible packing is very low, contrary to that of metal cans. Both in the case of flexible and rigid packings, the receptacles to be sterilized always contain noncondensable gases: air remaining occluded at the moment of closure of the packing, or gases dissolved in the foodstuffs treated and which are liberated by the effect of heat.

In view of this presence of air or other noncondensable gases, the pressure inside the packing is greater, for a given temperature, than the water-vapour tension at this same temperature. In an autoclave from which the air has been exhausted, the pressure which exists is equal to the water-vapour tension. The difference in temperature between the interior and the exterior of the packings is reduced partically to zero during the course of sterilization. The pressure inside the packings is therefore greater than that of the autoclave. In the case of metal cans which are mechanically strong, this condition has no importance, but this is not true in the case of flexible packings which are liable to burst in consequence of the internal over-pressure.

It is to avoid the risk of bursting of flexible packings that, in addition to means for heating the autoclave, pressurizing means are also provided to obtain a pressure higher than water-vapour tension.

In order to achieve this result, it has already been proposed to employ a heat treatment at a single temperature maintained for a sufficient period to ensure sterilization. In certain cases, this may result in an overcooking effect at the periphery of the product or insufficient sterilization at the heart of the product. This latter defect is frequently not detected, since the heart of a product is generally only slightly polluted, but the risk of a microbic accident none-the-less exists in its full gravity.

The present invention has for its object a sterilizing device for food products in flexible packages, e.g. preserves, which is free from these drawbacks and which provides irreproachable sterilization, with a simple and convenient construction and entirely reliable operation. The invention is directed, inter alia to a device for sterilizing vegetables, for example potatoes packed in flexible bags or pre-formed boat-shaped receptacles either under vacuum or by replacing air with another gas at a low absolute pressure for example carbon dioxide ($CO^2$).

The device according to the invention is characterized in that the autoclave is associated with two heated hermetically-closed tanks intended to be partly filled with water, upper and lower conduits being provided for respectively coupling the upper and lower parts of the autoclave to the tanks, while pumping means are intended to circulate hot water in a closed circuit through the autoclave, in such manner as to effect a heat treatment in two successive periods and at two different temperatures.

To this end, the two tanks are designed for different temperatures and are adapted to be put into use successively.

During a first period, known as pre-heating, the products to be sterilized are heated under pressure by one of the tanks in which the water is at about 100° C, and the other tank is then brought into use during the sterilization. The temperature is high at the level selected, for example 110° to 150° C with a pressure maintained higher than watervapour tension for the temperature chosen.

An arrangement of this kind according to the invention gives an excellent penetration of heat to the heart of the product to be sterilized, and avoids overcooking of the periphery while ensuring sterilization at the centre.

The heating of the tanks is preferably effected at the surface. The pumping means are advantageously provided in the lower conduits, which further comprise isolating means such as valves. The upper conduits also comprise isolating means such as valves. In addition, various emptying and draining devices are provided, together with means for cooling the autoclave after sterilization, and for re-charging the tanks with water.

Forms of construction of the invention are described below by way of example, reference being made to the accompanying drawings, in which.

Figure 1:
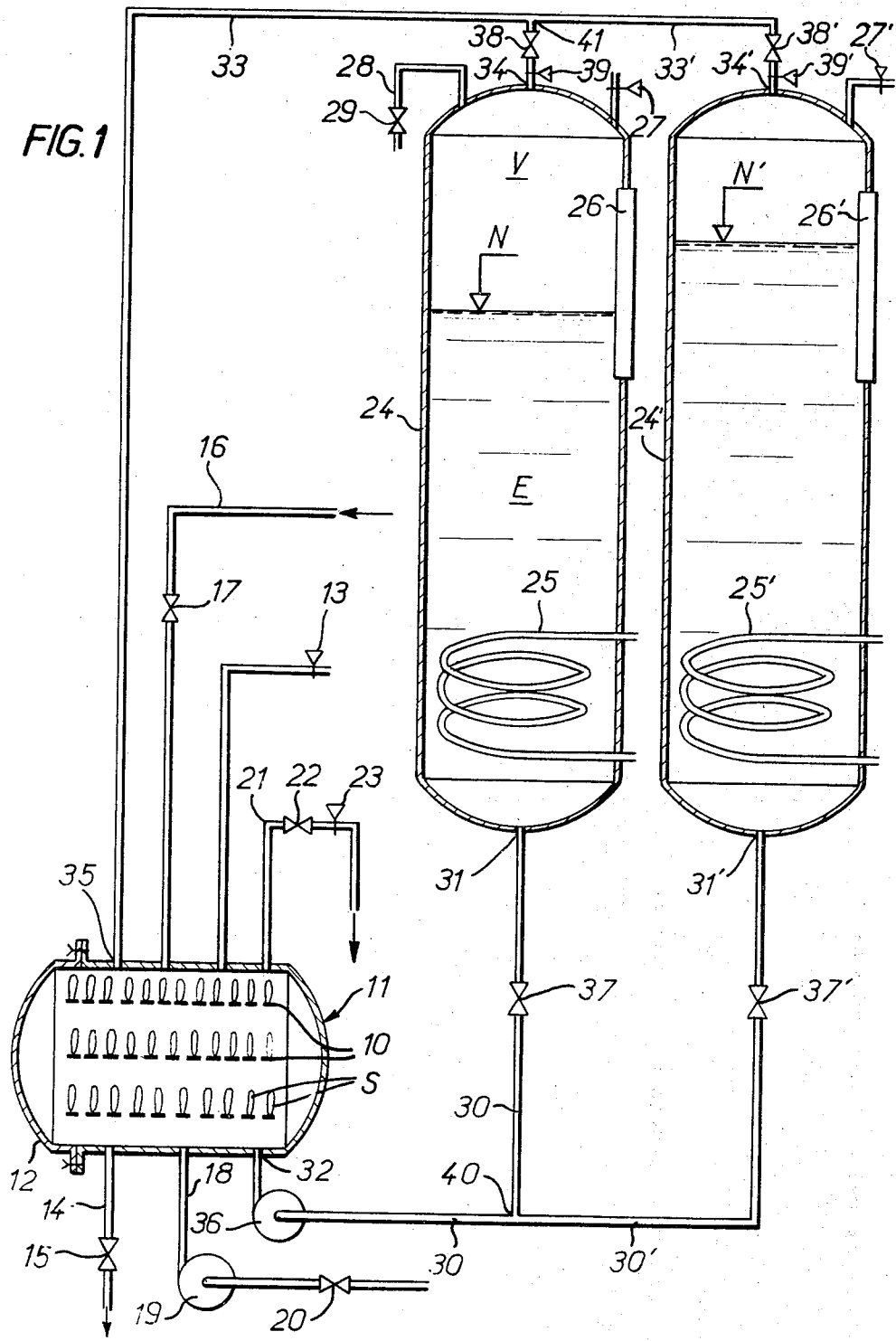
FIG. 1 shows diagrammatically a device for sterilizing food products, with two tanks according to the invention.

In the form of embodiment shown in FIG. 1, the flexible packages are bags indicated at S and containing potatoes, vegetables, fruit or other food products, packed in flexible bags, of transparent plastic material, for example.

The bags S are intended to be arranged vertically in removable baskets 10 inside at least one autoclave 11, on which there is shown at 12 a door with a hermetic closure.

The autoclave 11 comprises a safety valve 13 and an emptying conduit 14 having a valve 15. The emptying is facilitated by means of a device, preferably an injection conduit 16 for compressed air, provided with a valve 17. This valve 17 can only be opened when the valve 15 is itself open.

The autoclave 11 comprises at its lower portion a cold water supply conduit 18 having a pump 19 and a valve 20. The autoclave comprises at its upper portion a cooling water outlet conduit 21 provided with an isolating valve 22 and a back-pressure valve 23.

Heating means are provided in order to ensure sterilization of the vegetables contained in the bags S, and pressurizing means are also provided in order to create, outside the bags S, a pressure higher than the internal pressure of the bags S. To this end, a pre-heating tank 24 and a sterilizing tank 24' are associated with the autoclave. 11.

The pre-heating tank 24 comprises a heat exchanger 25 of the surface type, located in the bottom of the tank and preferably built in the form of a coil advantageously supplied with a heating fluid.

The tank 24 is intended to be partly filled with water up to a level N which can be observed through an observation aperture 26. The tank 24 comprises a safety valve 27 and a vent pipe 28 having a valve 29.

A lower conduit 30 connects the tank 24 to the autoclave 11 by their lower portions at 31 and 32. An upper conduit 33 connects the tank 24 to the autoclave 11 by their upper portions at 34 and 35. The lower conduit 30 comprises a pumping means such as a pump 36, and an isolating means such as a valve 37. The upper conduit 33 comprises on the one hand an isolating means such as a valve 38, and on the other hand an adjustable back-pressure valve 39.

The sterilizing tank 24' comprises a surface heat-exchanger 25' located in the bottom of the tank, preferably made in the form of a coil advantageously supplied with a heating fluid.

The tank 24' is intended to be partly filled with water up to a level N' which can be seen through an observation aperture 26'. The tank 24' comprises a safety valve 27'.

The tank 24' is connected by its lower portion at 31' to a lower conduit 30' which is connected on the lower conduit 30 at 40 to the upstream side of the pump 36 and the downstream side of the valve 37. The lower conduit 30' is also provided with a valve 37'. The tank 24' is connected by its upper portion at 34' to an upper conduit 33' which is connected to the upper conduit 33 at 41 on the upstream side of the valve 38. The upper conduit 33' is also provided with an isolating valve 38' and a back-pressure valve 39'.

The device shown in FIG. 1 thus comprises two hermetically sealed tanks 24 and 24', each provided with a heating means 25 and 25' and which enables successive treatments of the product to be sterilized, at different temperatures.

The water of the tank 24, which is heated to any desired temperature, preferably in the vicinity of 100° C. or less, enables a first heat treatment to be effected on the product to be sterilized, known as the pre-heating.

The preliminary operations consist of packing the autoclave 11 with bags S to be sterilized and obtaining the required conditions in the tank 24.

The autoclave 11 (isolated from the tanks 24 and 24' by the valves 37, 38, 37' and 38', the valves 15, 17, 20, 22 and 29 being also closed) is packed with bags S to be sterilized, placed vertically. The hermetically-closing door 12 is then closed and the autoclave 11 is then full of air at atmospheric pressure.

The tank 24, partly full of water up to the level N, is brought up by the heating 25, controlled by thermostat, at a pressure higher by at most 10° C. than that determined for the pre-heating. The vapour V over the water E is purged of air by the purge at 28, by opening the valve 29.

It is the ratio of the volume of the air included in the autoclave 11 to that of the vapour V in the tank 24 which determines the over-pressure due to the air for a given temperature.

The heat necessary for heating the autoclave 11 and the products to be sterilized is supplied especially by the calories given-up by the water E of the tank 24. In fact, the heating of the autoclave and its contents occupies only a small part of the cycle of operations, whereas, for economic reasons, the duration of operation of the heating device 25 of the tank 24 is spread as far as possible over the greater part of this cycle.

It is therefore desirable, in order to avoid all risk of overheating the bags, not to have any need to heat the water E to a temperature very much higher than that chosen for the pre-heating. It is therefore necessary that the ratio of the thermal inertia of the water E of the tank 24 to the autoclave 11 and its contents should be high, and it is so chosen that the difference between the temperature of the water E at the beginning of the cycle does not exceed by more than 10° C., if possible, the temperature chosen for the pre-heating.

These preliminaries having been made, the first operation consists of establishing a communication at 33 between the upper parts of the receptacles 11 and 24, by opening the valve 38. The pressures tend to balance each other in the case where the temperature of the water at 24 is higher than 100° C.

The valve 37 is then opened and the pump 36 is put into operation, which transfers the water E from the tank 24 into the autoclave 11 by the conduit 30. The autoclave 11 becomes filled with water and the air in the autoclave is expelled through the conduit 33 into the upper part of the tank. When the autoclave is full, the water follows the same circuit 33 and returns to the tank 24 in which it takes the place of the water which filled the autoclave.

This tank 24 then contains water surmounted by a mixture of air and water vapour. It is the presence of this air at this place which permits suitable pressurization of the superheated water filling the autoclave 11 and circulating in this latter, coming-in through the conduit 30 and passing out through the conduit 33.

There is thus obtained a circulation of pressurized hot water in closed circuit in the autoclave 11. This circuit is maintained until the temperatures are in equilibrium and during the time necessary for the preheating.

When the pre-heating is sufficient, the operation of sterilization proper is commenced, which is effected by circulation of the superheated water contained in the tank 24' and the temperature of which is comprised between 110° and 150° C.

The operations are then as follows: the pump 36 being still in operation, the valve 37' is opened and the valve 37 is closed. As the valve 38 is open and the valve 38' is closed, the water which is contained in the autoclave is evacuated into the tank 24. Any possible excess of pressure is eliminated by the safety-valve 27.

When the suitable level of water is reached in 24, the valve 38' is opened while the valve 38 is closed. It is then the tank 24' which works in a closed circuit with the autoclave 11 in order to ensure the sterilization of the products to be treated by a circulation of pressurized superheated water, the pressurization being effected by the pump 36 and the back-pressure valve 39', or more simply by the pressure losses in the circuit 33 between the autoclave and the tank.

When the sterilization is obtained, the valve 37' is closed, the pump 36 is stopped and cooling is started by injection of cold water into the autoclave.

The valve 20 is opened and the pump 19 is put into operation, which injects cold water at a sufficient pressure through the conduit 18 into the autoclave 11. This cold water is substituted for the hot water of the autoclave 11 and expels the hot water through the conduits 33 and 33' into the tank 24'. When the correct level is reached at N' in the tank 24', the valve 38' is closed and the valve 22 is opened, which ensures the discharge of the cold water through the clapper-valve 23, ensuring a suitable back-pressure.

When the cooling is considered to be sufficient, the valves 20 and 22 are closed, the pump 19 is stopped and the valve 15 is opened, which ensures the drainage of the autoclave 11. This drainage is preferably accelerated, if necessary, by injection of compressed air through the conduit 16, by opening the valve 17. The door 12 is opened and the sterilized bags S are removed.

In an alternative form and especially when it is desired to effect the pre-heating at a temperature lower than 100° C., the air which was contained in the autoclave and which was expelled into the tank 24 is permitted to escape through the conduit 28 and the valve 29. The overpressure is then ensured in the autoclave by the backpressure valve 39, or more simply by the pressure losses in the circuit 33 between the autoclave 11 and the tank 24.

This alternative has the advantage of making it possible to work several autoclaves with only two tanks, it being understood that each autoclave has its own hot-water circuit.

Figure 2:
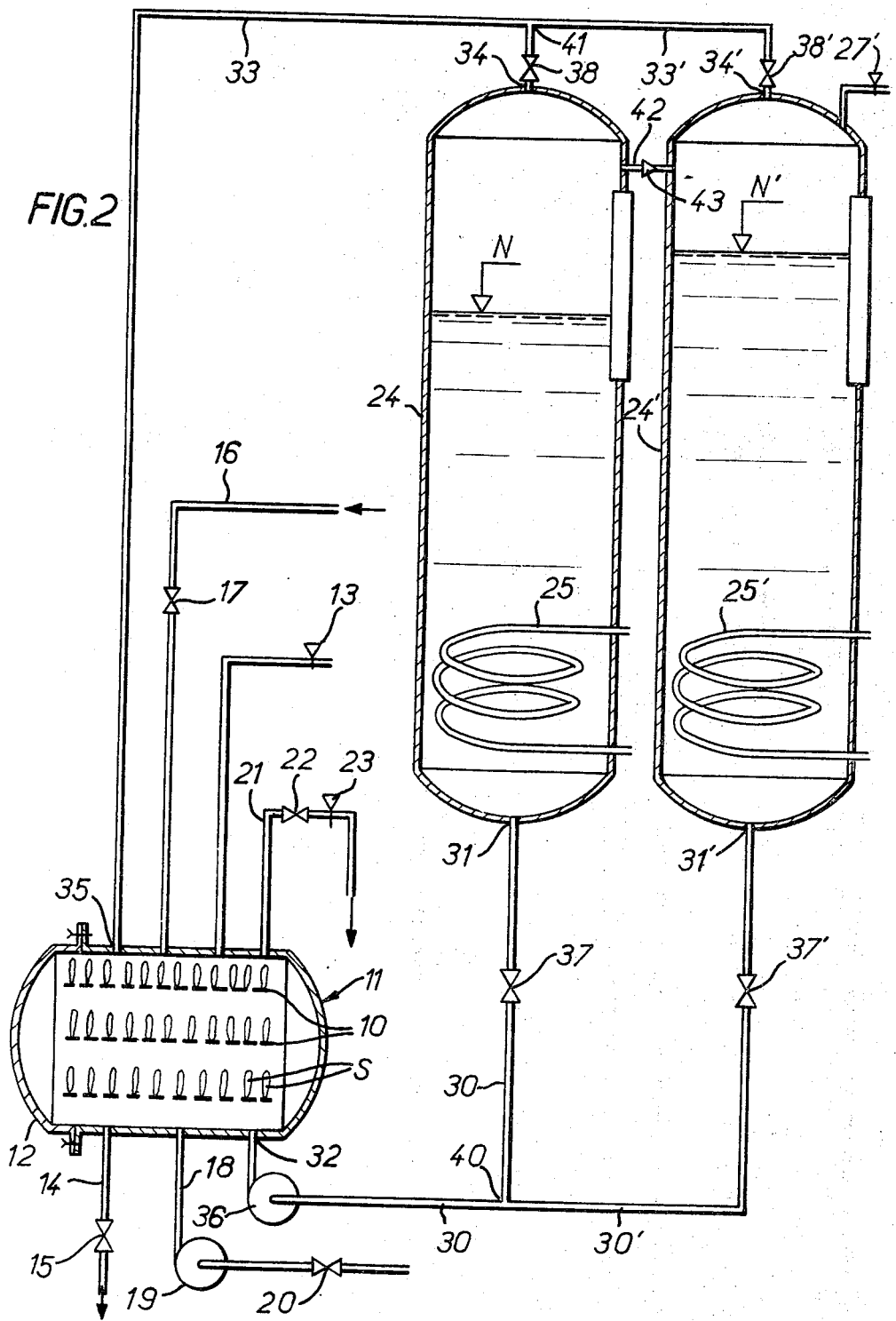
FIG. 2 is a view similar to FIG. 1 but relates to an alternative form.

Reference will now be made to FIG. 2 which is concerned with another form of embodiment of the invention, and in which the reference numbers of FIG. 1 have been adopted to designate similar elements.

In FIG. 2, the back-pressure valves 39 and 39' are eliminated. The two tanks 24 and 24' are connected to each other at their upper portions by means of a conduit 42 having a non-return valve 43. This latter permits a circulation only from 24 towards 24'.

The device shown in FIG. 2 thus comprises, as in FIG. 1, two hermetically-closed tanks 24 and 24', each provided with a heating means 25, 25' and which permit successive treatments to be made at different temperatures, of the product to be sterilized.

The water of the tank 24 which is heated to any desired temperature, preferably in the vicinity of 100° C. or less, permits a first heat treatment of the product to be sterilized, corresponding to pre-heating.

The tank 24' being isolated at 37' and 38', the process is started in the same way as that described with reference to FIG. 1.

The hot water from the tank 24 is sent from the autoclave 11 by the pump 36 and drives into the tank 24 the air included in the autoclave 11 at the moment of closure of this latter, after which the circulation of hot water is established in closed circuit, ensuring a first heat treatment of the products contained in the autoclave.

When this treatment is sufficient, the operation of sterilization proper is commenced, this being effected by circulation of the superheated water contained in the tank 24', and the temperature of which is comprised between 110° and 150° C.

The operations are then as follows: the pump 36 being still in operation, the valve 37 is closed and the valve 37' is opened. The valve 38 being open and the valve 38' closed, the water which is contained in the autoclave is expelled into the tank 24. The pressure then increases in the tank 24 and the air which was included in the autoclave 11 at the beginning of the operation, and which is now in the upper part of the tank 24, passes into the tank 24' through the non-return valve 43, and this takes place as soon as the pressure at 24 becomes greater than that at 24'.

When the suitable level of water is reached at N in 24, the valve 38' is opened while the valve 38 is closed. It is then the tank 24' which works in closed circuit with the autoclave 11 in order to ensure, by a circulation of pressurized superheated water, the sterilization of the products to be treated. When the sterilization is complete, the valve 37' is closed, the pump 36 is stopped and cold water is injected into the autoclave by means of the pump 19. The excess of over-pressure which causes the introduction into the circuit of this fresh quantity of water is eliminated by the operation of the safety-valve 27' which has the additional effect of purging air from the steam in the tank 24'.

The sequence of operations is then similar to that which has been described with reference to FIG. 1.

An example of the application of the invention is given below without any limitation, with reference to the installation shown in FIG. 1.

EXAMPLE

The sterilizing apparatus is constituted by a horizontal autoclave 11 having a volume of 1,000 litres and two vertical hot-water tanks 24 and 24' having volumes of 4,000 litres, provided with heating coils 25 and 25' installed in the lower quarter of the tanks and traversed by a thermal fluid (see FIG. 1).

Bags S of heat-sealing plastic material, each receiving 400 grams of raw scraped potatoes, the diameter of which is about 30 mm., are welded under vacuum. 500 bags are arranged vertically in metal baskets and are arranged in tens in the autoclave, which is closed.

The hot-water tank 24 contains 3,500 litres of water heated to a temperature of 110° C. and surmounted by steam purged of air, the valve 27 being set to 4 bars (value of the absolute pressure). The valve 29 of the air-vent 28 is closed. The tank 24' contains 3,800 litres of water and is heated to 140° C.

At the time zero, the valve 38 is opened in order to permit balancing of the pressures.

At the time 30 seconds, the valve 37 is opened and the pump 36 is started-up.

At the time 5 minutes, the pump 36 is stopped and the valve 37 is closed. The temperature reached throughout the whole of the autoclave is then 105° C. and the pressure is 2.8 bars absolute, of which 0.6 are due to the imprisoned air.

The valve 37 is then closed and the valve 37' is opened. The water superheated to 140° C. then passes into the autoclave expelling into the tank 24 the water at 105° C. previously contained by the autoclave. When the level chosen N is reached at 24, the valve 38' is opened and the valve 38 is closed. The circuit is thus established between 11 and 24', and the back-pressure valve 39' is set for a difference of pressure of 0.8 bar between the upstream and the downstream sides.

At the time 20 minutes, the valve 37' is closed, the pump 36 is stopped and an injection of cold water is effected through the conduit 18, by opening the valve 20 and starting-up the pump 19. The water from the autoclave is discharged into the tank 24'. When the level N' is reached, the valve 22 is opened and the valve 38' is closed. The cooling water flows through the back-pressure valve 23 which is set to 3.5 bars absolute.

At the time 25 minutes, the autoclave has become cool, the valves 20 and 22 are closed, the pump 19 is stopped and the autoclave is emptied through the conduit 14 by opening the valve 15 and sending compressed air through the conduit 16 while opening the valve 17. The autoclave being then empty of water, the input of compressed air is stopped and as soon as the internal over-pressure has been eliminated, the door 12 is opened in order to remove the sterilized bags from the autoclave 11.

What I claim is:

1. A sterilization device for sterilizing preserved food products in flexible packages, comprising an autoclave to receive flexible packages, two hermetically sealed heating tanks normally partly filled with water, means to maintain the normal temperature of the water in the tanks different from each other, a closed pressurized circuit connecting the autoclave to the tanks and including upper conduit means connected between the top portion of the autoclave and the top portions of each of the tanks for conducting water from the autoclave back to the tanks, lower conduit means connected between the lower portions of each of the two tanks and the lower portion of the autoclave for conducting water from the tanks to the autoclave, pumping means in series with said closed pressurized circuit for circulating water in said upper conduit means from the autoclave to the tanks, and in said lower conduit means from the tanks to the autoclave so that a continuous water flow is created in the autoclave from its bottom portion to its top portion, and valve means in series with said closed pressurized circuit for controlling the flow in the upper and lower conduit means for sequentially operating the autoclave with heated water from each of the heating tanks for desired periods of time.

2. A sterilization device as claimed in claim 1, wherein said pumping means is in the lower conduit means.

3. A sterilization device as claimed in claim 1, wherein said valve means includes valves in both the upper and lower conduit means.

4. A sterilization device as claimed in claim 1, further comprising heat exchange means for each of said heating tanks.

5. A sterilization device as claimed in claim 1, wherein the autoclave has means for circulating a coolant including an outlet conduit having a valve.

6. A sterilization device as claimed in claim 1, and means to maintain the normal temperature of the water in one of the tanks about 100° C. and between 110° C. and 150° C. in the other tank.

7. A sterilization device as claimed in claim 1, wherein each tank is connected to the upper conduit means via pressure drop means.

8. A sterilization device as claimed in claim 7, wherein one tank is provided with an air vent.

9. A sterilization device as claimed in claim 1, wherein conduit means interconnects the upper portions of said tanks and has a non-return valve.

* * * * *